United States Patent [19]

Kolb

[11] 4,311,969
[45] Jan. 19, 1982

[54] GAS LASER ASSEMBLY

[75] Inventor: William P. Kolb, Carlsbad, Calif.

[73] Assignee: Zoomar Corp., Irvine, Calif.

[21] Appl. No.: 114,608

[22] Filed: Jan. 23, 1980

[51] Int. Cl.³ .............................................. H01S 3/03
[52] U.S. Cl. ........................... 331/94.5 D; 331/94.5 C
[58] Field of Search ................. 331/94.5 D, 94.5 G, 331/94.5 C

[56] References Cited

U.S. PATENT DOCUMENTS 3,916,337 10/1975 Kindl et al. ................... 331/94.5 D Primary Examiner—William L. Sikes
Assistant Examiner—Leon Scott, Jr.
Attorney, Agent, or Firm—Ralph B. Pastoriza

[57] ABSTRACT

Maximum capillary discharge (bore) length within the distance available between the end mirrors in a gas laser assembly to thereby obtain maximum active gain length for the laser, is accomplished by utilizing a closed ended aluminum cathode in the glass envelope assembly. The cathode is arranged to shield a nickel-iron alloy end plate for the envelope and is attached directly to this end plate to effect both electrical contact by way of the end plate and at the same time be properly mechanically supported. The shape of the closed end of the cathode is further designed to provide for a more uniform current density distribution when the laser is operating. Further, small openings may be provided to admit ions into the area adjacent to the discharge capillary tube thereby facilitating initial breakdown of the gases in the laser when starting the laser.

9 Claims, 4 Drawing Figures

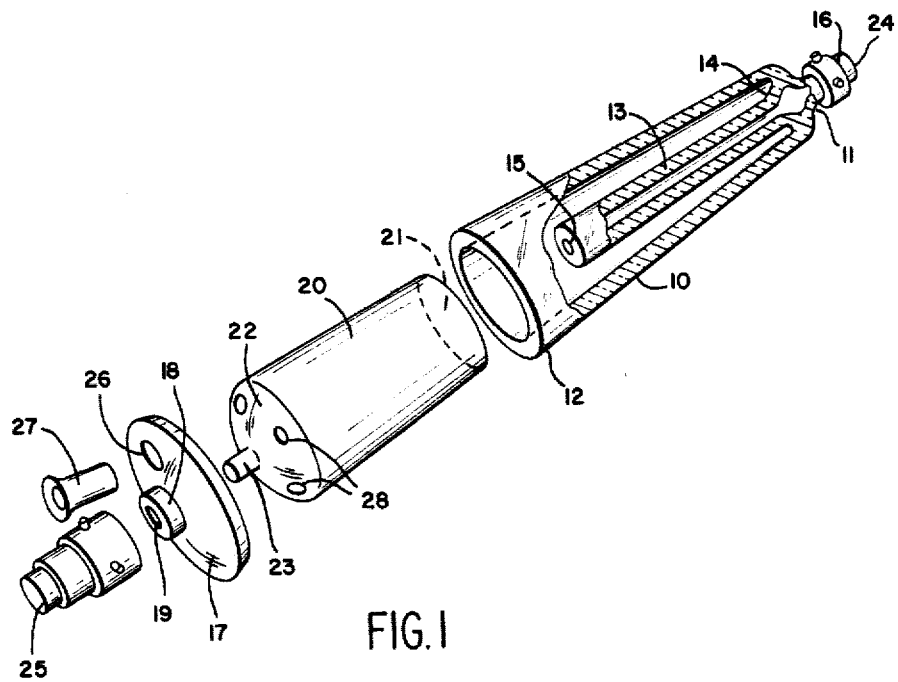
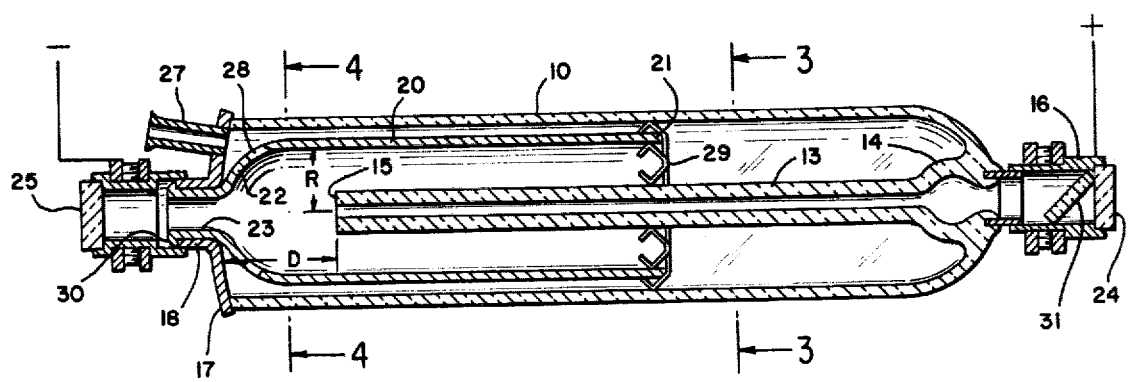
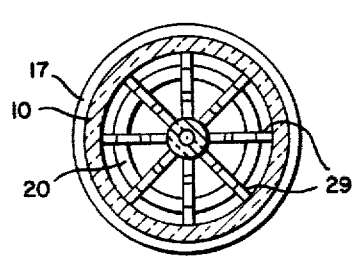
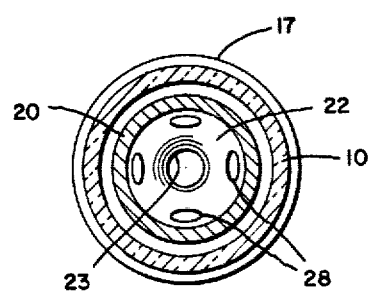
FIG.1
FIG.2
FIG.3
FIG.4

GAS LASER ASSEMBLY

This invention relates generally to gas lasers and more particularly to a gas laser assembly providing improved optical and structural features.

BACKGROUND OF THE INVENTION

Most gas laser devices such as helium neon type lasers utilize an aluminum cold cathode. This cathode is usually of cylindrical shape and longitudinally overlaps within a glass envelope the capillary discharge tube. In some of the more recent designs, the aluminum cold cathode has been mounted off a metal end plate closing the cathode end of the surrounding glass envelope. The mounting can be by springs or flexible leads between such end plate and the cathode.

The foregoing type designs place certain restrictions on the dimensioning of the components within the glass envelope. The end plate for the glass envelope at the cathode end of the envelope is generally of a nickel-iron alloy for effecting proper sealing with the glass of the envelope. Further, the coefficients of thermal expansion of this alloy and glass can be made essentially the same so that proper sealing will be maintained over wide temperature variations. On the other hand, the presence of a nickel-iron alloy end plate at the cathode end of the envelope can result in electron emission from the end plate itself because of the proximity of the cathode electrode. Such emission is very undesirable since the nickel-iron alloy has the property of sputtering at very low current densities and thus the useful life of the laser tube is drastically reduced.

The foregoing problem can be solved by physically positioning the aluminum cathode itself sufficiently far from the end plate to insure that little or no electron emission occurs from the end plate surface but that all emission takes place from the inside surface of the aluminum cathode. Such positioning of the cathode, however, prevents full utilization of the space in the envelope body between the end mirrors defining the resonant cavity. As a consequence, maximum active gain length is not utilized.

BRIEF DESCRIPTION OF THE PRESENT INVENTION

With the foregoing considerations in mind, the present invention contemplates a greatly improved gas laser assembly wherein the aluminum cold cathode and other components are so designed as to realize maximum active gain length or maximum capillary discharge (bore) length within the distance available between the end mirrors. A more efficient gas laser thus results.

Essentially, the invention includes means for providing a closed volume such as an elongated enclosing envelope having anode and cathode end portions together with an elongated capillary discharge tube in the envelope having a first end portion positioned at the anode end portion of the envelope and an extending second end terminating in an opening short of the far end of the cathode end portion of the envelope. An anode electrode is supplied at the anode end of the envelope in communication with the first end of the capillary discharge tube. A nickel-iron alloy end plate is provided for closing off the cathode end portion of the envelope and this plate is designed with a central axially extending neck section defining a central opening. A cylindrically shaped aluminum cold cathode is provided opening out at a first end and having a shaped structure closing off a major portion of its second end. This shaped structure has an extending cylindrical snout receivable within the central opening of the end plate neck section so that the cathode is positioned and supported in the envelope by the end plate. The construction also provides for a reliable electrical connection between the cathode and end plate. The cathode coaxially receives in its first open end the capillary tube, the second open end of the capillary tube being axially spaced from the interior of the shaped end of the cathode by a given distance at least as great as the radial distance between the open end and the inner cylindrical wall of the cathode to thereby protect the end plate from the discharge action at this second open end of the capillary tube. Thus, the shaped structure closing off the end of the cathode serves to shield the end plate so that the one end of the cathode can be disposed essentially against this end plate and thereby permit maximum length for the capillary tube without risking current emission from the end plate itself.

The assembly is completed by appropriate end mirrors on opposite ends of the envelope normal to the axis of the capillary tube to define an optical cavity for the laser.

BRIEF DESCRIPTION OF THE DRAWINGS

A better understanding of this invention as well as further features and advantages thereof will be had by now referring to the accompanying drawings in which:

FIG. 1 is an exploded perspective view of the basic components making up the gas laser assembly of this invention;

FIG. 2 is a longitudinal cross section of the various components of FIG. 1 after they have been assembled together;

FIG. 3 is a transverse cross section looking in the direction of the arrow 3—3 of FIG. 2; and, FIG. 4 is another transverse cross section looking in the direction of the arrow 4—4 of FIG. 2.

DETAILED DESCRIPTION OF THE PREFERRED EMBODIMENT

Referring first to FIG. 1, the gas tube assembly includes an elongated enclosing envelope 10 having anode and cathode end portions 11 and 12. An elongated capillary discharge tube 13, in turn, is provided in the envelope and has a first end 14 which in the embodiment disclosed constitutes an integral portion of the anode end of the envelope 10. The second end of the capillary discharge tube 13 terminates in an opening 15 short of the far end 12 of the cathode end portion of the envelope 10 as shown. An anode electrode 16 is provided at the first anode end portion of the envelope 10, this anode being in communication with the first end portion 14 of the capillary discharge tube 13.

The second end 12 of the elongated envelope 10 is arranged to be closed off by an end plate illustrated at 17. In accord with a feature of this invention, end plate 17 includes an axially extending neck section 18 defining a central opening 19.

Cooperating with the end plate 17 is a cylindrically shaped cold cathode 20 made of aluminum opening out at a first end 21 and having a shaped structure 22 closing off a major portion of its second end. The shaped structure 22 is preferably dome shaped and includes an extending cylindrical snout 23. Snout 23 is arranged to be coaxially received within the central opening 19 of the neck section 18 on end plate 17 when the same are assembled.

The major components of the gas laser shown in FIG. 1 are completed by the provision of end mirrors 24 and 25 normal to the axis of the capillary discharge tube 13 serving to define an optical resonant cavity for the laser. In the particular embodiment illustrated in FIG. 1, exhausting of air from the assembled components is accomplished through an appropriate exhaust port 26 and exhaust tube 27 in the end plate 17, although exhausting of the air could take place elsewhere.

In the preferred embodiment of the invention as illustrated in FIG. 1, the dome shaped structure 22 defining the closed second end portion of the cathode 20 is provided with a plurality of small openings 28 for permitting ions to drift into this end portion of the cathode adjacent to the opening 15 of the capillary discharge tube 13 when the parts are assembled.

Referring now to FIG. 2, the assembled relationship of the components described in FIG. 1 will be evident. The coaxial relationship of the snout 23 for the cathode 20 within the extended neck portion 18 of the end plate 17 will be clear. Further, it will be noted that the capillary discharge tube 13 is further supported intermediate its ends by an appropriate spider structure 29 engaging the first end portion 21 of the cathode 20, the interior wall of the envelope 10 and the exterior portion of the discharge tube where it enters the first end opening 21 of the cathode. These engagements by the spider support the discharge tube and the cathode in coaxial relationship with each other and with the axis of the cylindrical envelope 10.

The spider 29 cooperates with the nesting of the snout 23 in the neck section 18 of the end plate in supporting the cathode 20. In this respect, and in the specific embodiment disclosed, the axial length of the snout 23 is greater than the axial length of the opening 19 in the neck section 18 so that the end of the snout can be peened over the neck section as at 30 to provide for a more reliable axial supporting of the second end of the cathode as well as providing for a reliable electrical connection of the cathode to the end plate.

In the particular embodiment shown in FIG. 2, there is provided a Brewster window in the anode end of the envelope as shown at 31.

Referring back to the cathode end of the envelope, it will be evident that the preferred dome shaped structure is essentially hemispherical with a center corresponding approximately to the position of the second end 15 of the capillary discharge tube 13. The arrangement is such that interior parts of the structure closing the end of the cathode are at approximately equal radial distances from the end 15 to thereby provide for a substantially uniform current density on the surface of the cathode. Further, it will be noted that the second open end 15 of the capillary tube is axially spaced from the interior of the end plate 17 by a distance D at least as great as the radial distance R between the open end 15 and the inner cylindrical wall of the cathode 20. This dimensioning essentially assures that the end plate is protected from discharge action at the second open end of the discharge supporting tube.

With respect to the foregoing, it will be recalled that any electron emission from the end plate is undesirable as sputtering can result and the overall life of the laser tube be greatly shortened. The provision of the closed end portion for the cathode serves as a shield for this end plate and moreover, the provision of the snout on the cathode extending into the opening in the end plate and actually peening about the periphery of this opening at the exit end provides further protection.

FIG. 3 illustrates the spider structure 29 in better detail wherein there are provided a plurality of radial arms with finger portions for holding the open end of the cathode and the exterior portion of the capillary discharge tube in proper coaxial relationship relative to the interior cylindrical wall of the envelope 10.

FIG. 4 illustrates the various openings 28 wherein four such openings are provided in the shaped end portion 22 of the cathode. The provision of the plurality of small holes 28 is to provide in the use of the use of the teachings of U.S. Pat. No. 3,792,372, a short path for ions to drift into the area adjacent to the discharge open end 15 of the capillary discharge tube 13. Thus, it is easier to start the laser with these ions present as it reduces the required voltage to effect a reliable breakdown. In the absence of the plurality of openings 28, ions would have to traverse into the open end 21 of the cathode passed the spider 29 to reach the vicinity of the opening 15 in the capillary discharge tube and this longer path would greatly reduce the number of ions reaching the desired region. Starting would thus not be as effective if effective at all.

By the foregoing structural arrangement, the cathode 20 can be supported and positioned close to the end plate 17 the closed end 22 protecting the end plate. Further, by virtue of this closed end 22 the second open end 15 of the capillary discharge tube 13 can be brought closer to the end plate so that the bore in this tube is lengthened with the effect of lengthening the gain path of the laser for a given set position of the end mirrors 24 and 25.

From all of the foregoing it will be evident that the present invention has provided a greatly improved gas laser construction particularly useful for helium neon lasers.

I claim:

1. A gas laser assembly including, in combination:
   (a) means for providing a closed volume having anode and cathode end portions;
   (b) an elongated capillary discharge tube in said volume having a first end positioned at said anode end portion of said volume and an extending second end terminating in an opening short of the far end of the cathode end portion of said volume;
   (c) an anode electrode secured to said anode end portion of said volume in communication with said first end of said capillary discharge tube;
   (d) an end plate for closing off the cathode end portion of said closed volume; and,
   (e) a cathode having a first end surrounding at least a portion of said extending second end of said capillary discharge tube and having a shaped structure closing off a major portion of its second end, said second end being secured to and supported by said end plate, the second open end of said capillary discharge tube being axially spaced from the interior of said shaped structure of the cathode by a given distance at least as great as the radial distance between said open end and the inner wall of said cathode to thereby protect said end plate from discharge action at said second end of said capillary tube and provide for a uniform current density on the interior surface of said shaped structure of said cathode.

2. A gas laser assembly including, in combination:

(a) an elongated enclosing envelope having anode and cathode end portions;

(b) an elongated capillary discharge tube in said envelope having a first end positioned at said anode end portion of said envelope and an extending second end terminating in an opening short of the far end of said cathode end portion of said envelope;

(c) an anode electrode secured to said anode end portion of said envelope in communication with said first end of said capillary discharge tube;

(d) an end plate for closing off said cathode end portion of said envelope having a central axially extending neck section defining a central opening;

(e) a cylindrically shaped cathode opening out at a first end and having a shaped structure closing off a major portion of its second end, said shaped structure having an extending cylindrical snout, said end plate neck section coaxially receiving said cylindrical snout in its central opening so that said cathode is positioned and supported in said envelope by said end plate and thereby is electrically connected to said end plate, said cathode coaxially receiving in its first open end said capillary tube, the second open end of said capillary tube being axially spaced from the interior of the shaped end of the cathode by a given distance at least as great as the radial distance between said open end and the inner cylindrical wall of said cathode to thereby protect said end plate from said discharge action of said second end of said capillary tube; and (f) end mirrors on opposite ends of said envelope normal to the axis of said capillary tube to define an optical cavity for said laser.

3. The subject matter of claim 2, in which said capillary discharge tube has its first end integrally formed with and supported by the anode end portion of said envelope spider structure engaging said first end of said cathode, the interior wall of said envelope and the exterior portion of said discharge tube where it enters said first end of the cathode to support the discharge tube and cathode in coaxial relationship with each other and said envelope.

4. The subject matter of claim 2, in which said structure is dome shaped with a center corresponding approximately to the position of said second end of said capillary discharge tube so that interior portions of the dome shaped structure closing the end of the cathode are at approximately equal radial distances from said second end of the capillary tube to thereby provide for a substantially uniform current density on the emitting surface of said cathode.

5. The subject matter of claim 2, in which said cylindrical snout is of greater axial length than said central opening defined by said neck section into which it is received, the end of said snout being secured to the end of said neck section to provide for a secure axial support of said second end of said cathode, shielding of said end plate portion otherwise exposed by said neck opening from discharge, and a reliable electrical connection of said cathode to said end plate.

6. The subject matter of claim 2, in which said shaped structure closing a major portion of said second end of said cathode includes a plurality of holes for admitting gas ions to an area adjacent to the said second open end of said capillary tube to thereby facilitate starting of said laser.

7. The subject matter of claim 2, in which said gas laser constitutes a helium neon laser.

8. The subject matter of claim 2, in which said elongated envelope includes a Brewster window in said anode end.

9. The subject matter of claim 2, including a spider structure engaging said first end of said cathode, the interior wall of said envelope and the exterior portion of said discharge tube where it enters said first end of the cathode to support the discharge tube and cathode in coaxial relationship with each other and said envelope.

* * * * *